G. A. BUSHNELL & M. CALHOUN.
Fruit-Picker.
No. 212,588. Patented Feb. 25, 1879.
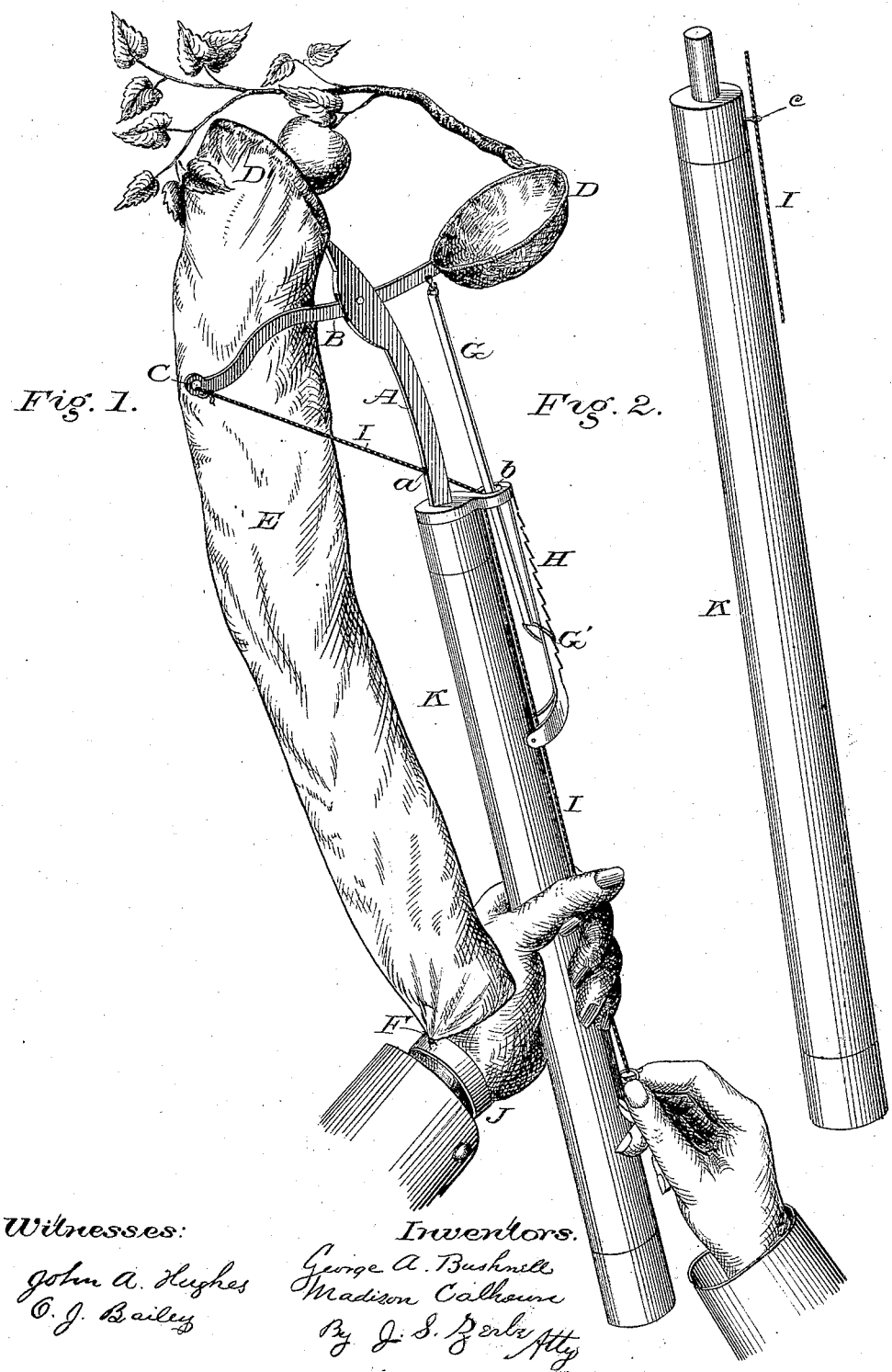

UNITED STATES PATENT OFFICE.

GEORGE A. BUSHNELL AND MADISON CALHOUN, OF CIMARRON, TERRITORY OF NEW MEXICO.

IMPROVEMENT IN FRUIT-PICKERS.

Specification forming part of Letters Patent No. 212,588, dated February 25, 1879; application filed June 14, 1878.

*To all whom it may concern:*

Be it known that we, GEORGE A. BUSHNELL and MADISON CALHOUN, of Cimarron, in the county of Colfax and Territory of New Mexico, have invented a new and useful Improvement in Fruit-Pickers, which improvement is fully set forth in the following specification and accompanying drawings, in which—

Figure 1 is a perspective view of our improved fruit-picker; Fig. 2, a view, in section, of the rod.

The object of our invention is to provide a picker which shall be adapted to picking fruit of all kinds, whether the fruit be high or low, so that it may be gathered without bruising, or for thinning fruit, and so constructed that it is not necessary for the operator to lower the picker in removing the fruit, all of which will be hereinafter more fully described.

In the drawings, K represents the pole of an ordinary picker, made in sections, so that it can be used for any desired height. The top of this pole is provided with jaws A B. The piece A, connecting directly with the pole K, is provided with a circle or loop, D', around the periphery of which the mouth of a bag, E, is placed. The diameter of this bag is no larger than the circle D', and in use is also made in sections corresponding in length to the sections of pole K. On the lower end of bag E we fasten a rubber band or strap, J, which is attached to or placed over the left wrist of the operator in such a manner that when the fruit is picked it will be conveyed through the bag E into the left hand.

The other piece, B, of the jaw is provided with a circle or loop, D, corresponding in size to the circle D'. A piece of canvas or cloth is stretched over this. The opposite end of piece B is provided with a loop, C, to which is attached a cord, I. This cord passes through a hole in the lower part of piece A, thence through eye *b* and downward. The lower end of cord I, being provided with an ordinary ring, can be used by the operator's right hand for moving the piece B of the jaw in grasping the fruit.

We have also provided a rubber spring, G, for distending the jaws A B, the lower end of said rubber being provided with a ring, which is placed around a ratchet-bar, H, for the purpose of giving proper tension to the rubber G by moving the ring upward or downward.

In practical operation the band J is placed over the wrist of the left hand, and the pole K is grasped with both hands until the fruit is picked and comes to the lower end of the bag, when the operator places the end of the pole on the right thigh, at the same time holding the picker in an upright position. He then drops his left hand, which motion conducts the fruit into the left hand.

We are aware that the arrangement of jaws as herein shown is not new, and we do not claim the same, broadly; but What we do claim is—

In a fruit-picker, the combination of the jaws A B, ratchet-bar H, spring G, and cord I, substantially as shown and described.

In testimony that we claim the foregoing we have hereunto set our hands.

GEORGE A. BUSHNELL.
MADISON CALHOUN.

In presence of—
HENRY WHIGHAM,
CHAS. F. HUNT.